Oct. 19, 1937.  E. GUBERNICK  2,096,241
POULTRY PERCH
Filed March 27, 1936
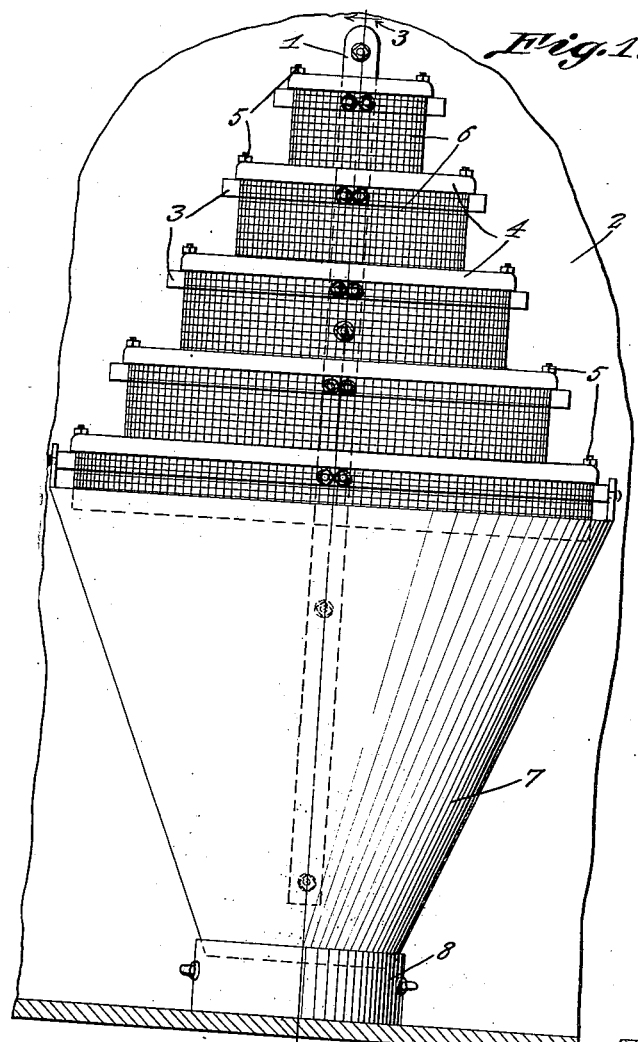
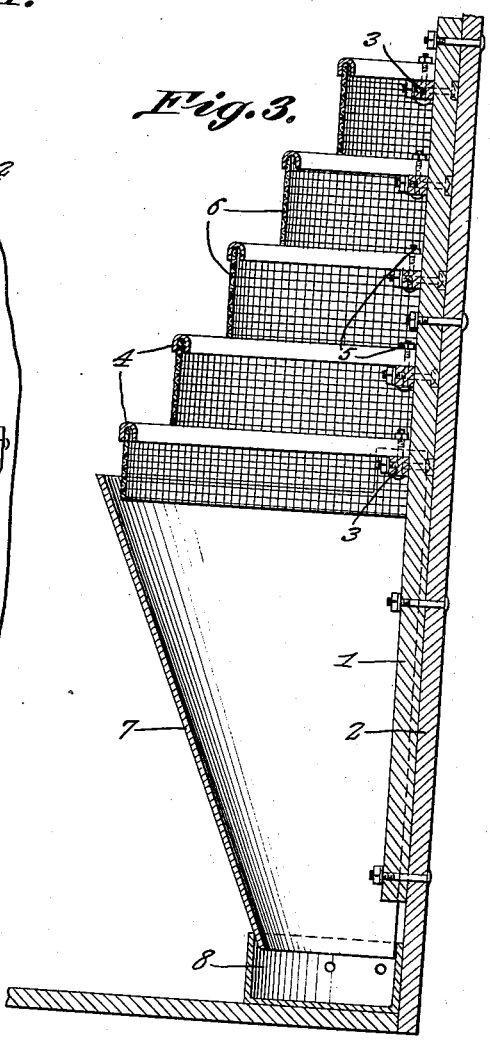
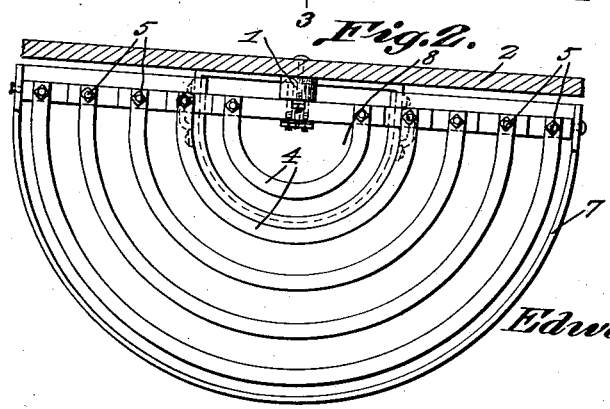
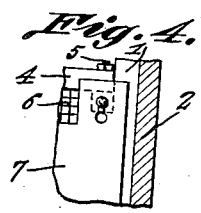
Edward Gubernick, INVENTOR
BY Victor J. Evans & Co.
ATTORNEY Patented Oct. 19, 1937

2,096,241

UNITED STATES PATENT OFFICE 2,096,241

POULTRY PERCH

Edward Gubernick, Richwood, W. Va.

Application March 27, 1936, Serial No. 71,201

3 Claims. (Cl. 119—22)

This invention relates to poultry roosts or perches adaptable for poultry houses or henneries and has for the primary object the provision of a device of this character which will provide maximum sanitation and accommodation for poultry without crowding and will direct droppings to a single container easily removed for emptying and cleaning.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a front elevation illustrating a poulty perch constructed in accordance with my invention.

Figure 2 is a top plan view illustrating the same.

Figure 3 is a sectional view taken on the line 3—3 of Figure 1.

Figure 4 is a fragmentary view showing means of securing a hopper to the roost or perch.

Referring in detail to the drawing, the numeral 1 indicates a supporting strip bolted or otherwise secured in a vertical position to a wall 2 of a hennery or poultry house and has secured thereto relatively spaced horizontally arranged members 3. Said members 3 provide mountings for a series of arcuately curved perch elements 4, the ends being bolted or otherwise secured to the members 3, as shown at 5. The perch elements 4 are arranged in superimposed relation and in stepped formation, this being accomplished by constructing the perch elements so that they progressively increase in size downwardly with respect to their positions on the supporting strip 1. Each perch element is of channel-iron construction with the opening of the channel disposed lowermost and receiving therein a foraminous strip 6. The foraminous strips depend from their respective perch elements into the perch element adjacent thereto and in a plane therebelow. The foraminous strips act to prevent chickens roosting on the perch elements from entering the hopper-like element 7. By lifting up on the hopper-like element 7, the receptacle 8 can be easily removed for emptying and cleaning.

Due to the shape or curvature of the perch elements a maximum number of chickens may perch on to roost without overcrowding. Also, the chickens may face inwardly or outwardly and regardless of which direction they face, the droppings will pass into the hopper-like member 7. The perch elements may be constructed from any material suitable for the purpose and if made of metal a suitable cover (not shown) may be placed thereon for protecting the feet of the poultry.

Having described the invention, I claim:

1. A poultry perch comprising a supporting member, a series of longitudinally extending and relatively spaced bars secured to said supporting member, a plurality of arcuately curved perch elements having the ends thereof detachably secured to the bars adjacent the ends of the latter and said perch elements varying in lengths to group said perch elements in step formation, and means for collecting droppings from poultry resting on the perch elements.

2. A poultry perch comprising a supporting member, a series of longitudinally extending and relatively spaced bars secured to said supporting member, a plurality of arcuately curved perch elements having the ends thereof detachably secured to the bars adjacent the ends of the latter and said perch elements varying in lengths to group said perch elements in step formation, foraminous strips secured to the perch elements and depending therefrom, and a hopper-like means receiving droppings from poultry resting upon the perch elements.

3. A poultry perch comprising a supporting member, a series of longitudinally extending and relatively spaced bars secured to said supporting member, a plurality of arcuately curved perch member, a plurality of arcuately curved perch elements having the ends thereof detachably secured to the bars adjacent the ends of the latter and said perch elements varying in lengths to group said perch elements in step formation, foraminous strips secured to the perch elements and depending therefrom, a hopper-like element receiving droppings from poultry resting upon the perch elements, and a receptacle for collecting droppings from the hopper-like element and normally closing the lower end of the hopper-like element.

EDWARD GUBERNICK.